(12) United States Patent
Hwang et al.

(10) Patent No.: US 12,738,534 B2
(45) Date of Patent: Sep. 15, 2026

(54) ALLOY FORMATION METHOD FOR A SOLID-STATE BATTERY AND THE SOLID-STATE BATTERY THEREOF

(71) Applicant: National Taiwan University of Science and Technology, Taipei (TW)

(72) Inventors: Bing-Joe Hwang, Taipei (TW); Sheng-Chiang Yang, Taipei (TW); Berhanu Degagsa Dandena, Taipei (TW); Wei-Nien Su, Taipei (TW); She-Huang Wu, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 488 days.

(21) Appl. No.: 18/482,194

(22) Filed: Oct. 6, 2023

(65) Prior Publication Data

US 2024/0178444 A1 May 30, 2024

(30) Foreign Application Priority Data

Nov. 24, 2022 (TW) ................................. 111144943

(51) Int. Cl.

| | |
|---|---|
| ***H01M 10/0562*** | (2010.01) |
| ***C01B 25/14*** | (2006.01) |
| ***H01M 4/02*** | (2006.01) |
| ***H01M 4/134*** | (2010.01) |
| ***H01M 4/1395*** | (2010.01) |
| ***H01M 4/36*** | (2006.01) |
| ***H01M 4/38*** | (2006.01) |
| ***H01M 10/0585*** | (2010.01) |
| ***H01M 10/42*** | (2006.01) |
| ***H01M 10/44*** | (2006.01) |

(52) U.S. Cl.

CPC ......... *H01M 10/0562* (2013.01); *C01B 25/14* (2013.01); *H01M 4/134* (2013.01); *H01M 4/1395* (2013.01); *H01M 4/366* (2013.01); *H01M 4/382* (2013.01); *H01M 10/0585* (2013.01); *H01M 10/4235* (2013.01); *H01M 10/44* (2013.01); *C01P 2002/54* (2013.01); *C01P 2004/03* (2013.01); *C01P 2006/40* (2013.01); *H01M 2004/027* (2013.01); *H01M 2300/008* (2013.01); *H01M 2300/0094* (2013.01)

(58) Field of Classification Search

CPC ........................... H01M 10/0562; C01B 25/14

See application file for complete search history.

(56) References Cited

U.S. PATENT DOCUMENTS

2019/0198917 A1* 6/2019 Seong ..................... C01B 25/14
2024/0356064 A1* 10/2024 Ryu ........................ H01M 4/02

* cited by examiner

*Primary Examiner* — Stephan J Essex
(74) *Attorney, Agent, or Firm* — Best & Flanagan LLP

(57) ABSTRACT

Present invention provides an innovative alloy formation method for a solid state battery and the sold state battery thereof. The said sulfide solid-state electrolyte is doped with anode-philic material to replace the cation ion when synthesizing the sulfide solid-state electrolyte to improve its ionic conductivity but reduce the electronic conductivity avoiding internal electricity leakage. The present invention can also increase the moisture resistance for the sulfide solid-state electrolyte. After performing life cycles, an alloy is formed on an interface of the sulfide solid-state electrolyte which could stabilize and prolongs the life cycles of the full battery.

13 Claims, 6 Drawing Sheets

ALLOY FORMATION METHOD FOR A SOLID-STATE BATTERY AND THE SOLID-STATE BATTERY THEREOF

FIELD OF THE INVENTION

A method for stabilizing a solid-state battery, more particularly, a method that uses a sulfide solid electrolyte doped with a specific anode-philic substance to stabilize the solid-state battery and the solid-state battery.

BACKGROUND OF THE INVENTION

Along with the advancement of technology and the development of new materials, it has truly made a major contribution to the development of secondary lithium batteries, and along with portable appliances such as cell phones and notebooks introduced to the world, the demand for high-performance, compact, and lightweight batteries for those portable appliances has increasingly become much stronger. In primary or secondary batteries, capacitors, and other electrochemical components, most of them use liquid electrolytes as the conductive material for manufacturing new batteries. Liquid electrolytes have the risk of liquid leakage or the disadvantage of lacking long-term stability, as well as the problems of easy corrosion, easy combustion, poor safety, and low reliability, so the liquid electrolytes cannot fully meet the safety requirements of large-scale industrial energy storage.

In order to further improve the safety of liquid electrolytes, the development of solid electrolytes has changed this dilemma to a high degree. However, even though solid electrolytes have the advantage of being safer than liquid electrolytes, the interface of solid electrolytes in all solid electrolyte lithium batteries and the interface of lithium metal are still prone to impedance. If wanting to take in to account the ionic conductivity and reducing the electrolyte electronic conductivity simultaneously, to avoid internal electricity leakage and increase the moisture resistance of the solid electrolyte, it is no doubt that will lead to a higher production cost and requires more additional techniques to process the electrodes. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the problems that the interface of the solid electrolyte of a full solid electrolyte lithium battery and the interface of lithium metal are prone to impedance, as well as the increase of the production cost, the present invention provides a method for forming an interface alloy for a solid-state battery, the steps of which include providing a solid-state battery comprising at least one anode and one cathode, providing a solid electrolyte doped with the sulfide between the anode and the cathode, wherein, the doped sulfide solid electrolyte comprises an anode-philicmaterial (M) doped in a sulfide solid electrolyte in which the content of doping is based on phosphorus (P) in the sulfide solid electrolyte, to form the doped sulfide solid electrolyte with a ratio of $M_xP_{1-x}$, where x is 0.001~0.999; an alloy formed at an interface between the anode and the doped sulfide solid electrolyte by the anode-philic material and the anode metal after conducting at least one charge/discharge cycle of the solid-state battery.

The present invention further provides a solid-state battery comprising at least an anode and a cathode, a doped sulfide solid electrolyte made by the foregoing method is contained between the anode and the cathode, and an alloy formed at the interface between the anode and the sulfide solid electrolyte.

Through the above description, it can be seen that the present invention replaces the cationic position of the solid electrolyte by adding the specific anode-philic substance in the process of synthesizing electrolyte, which can simultaneously take into account the advantages of ionic conductivity and reducing electrolyte electronic conductivity to avoid internal electricity leakage and increase the moisture resistance of solid electrolyte at the same time. After charging and discharging, forming an alloy stabilization interface at the electrolyte interface independently has significantly extended the service life in the performance of the solid-state battery with the sulfide solid electrolyte.

BRIEF DESCRIPTION OF THE DRAWINGS

The steps and the technical means adopted by the present invention to achieve the above and other objects can be best understood by referring to the following detailed description of the preferred embodiments and the accompanying drawings.

FIG. 4A is relatively loose and FIG. 4B, the embodiment of the present invention, is relatively denser due to the alloy protecting the electrolyte surface.

DESCRIPTION OF THE PREFERRED EMBODIMENTS

Figure 1:
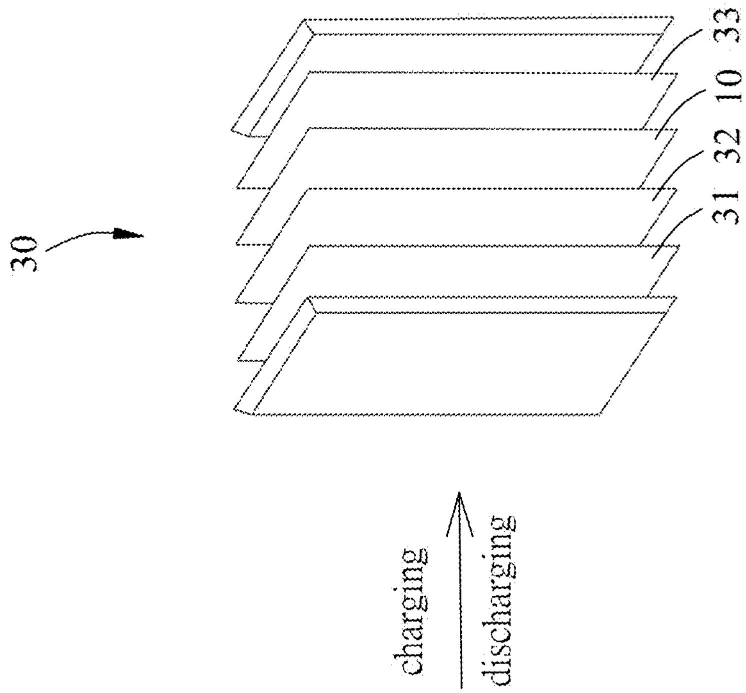
FIG. 1 is an illustration an effect of stabilizing a solid-state battery during its charging and discharging process using the doped sulfide solid electrolyte in accordance with the present invention.
Figure 1:
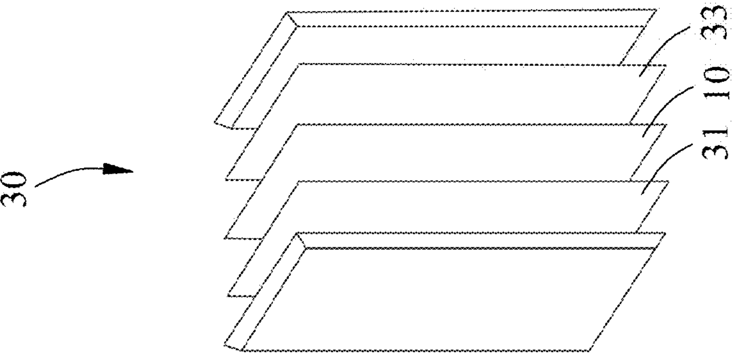

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<Sulfide Solid Electrolyte>

The present invention comprises a doped sulfide solid electrolyte 10 formed by doping a sulfide solid electrolyte with an anode-philicmaterial.)

The said sulfide solid electrolyte before doping is preferably prepared by a mixture of (100-x)$Li_2S$-x$P_2S_5$, wherein x is a positive integer less than 100, such as $Li_7P_3S_{11}$ (when x=30) and a lithium compound (LiB). The lithium compound (LiB) comprises lithium fluoride, lithium chloride, lithium bromide, lithium iodide, or any combination thereof (B=F, Cl, Br, I, or combinations thereof) of the preferred embodiment of the sulfide solid electrolyte in the present invention could be $Li_6PS_5Cl$. The anode-philic material in the present invention refers to a material with an affinity towards an anode, or especially to an anode metal of an electrochemical device, especially to the material has the ability to help or facilitate the anode metal deposition and to form alloy on an anode side with the anode metal after at least one charging or discharging life cycle. The said anode metal in this present invention comprises but is not limited to Lithium, Sodium, Zinc, Aluminum, Indium, Copper or combination thereof.

The anode-philic material includes the following elements and its combination or its compounds: antimony (Sb), magnesium (Mg), calcium (Ca), strontium (Sr), barium (Ba), scandium (Sc), yttrium (Y), aluminum (Al), gallium (Ga), indium (In), titanium (Ti), silicon (Si), germanium (Ge), tin (Sn), lead (Pb), arsenic (As), antimony (Sb), bismuth (Bi), selenium (Se), tellurium (Te), rhodium (Rh), iridium (Ir), palladium (Pd), platinum (Pt), silver (Ag), gold (Au), zinc (Zn), cadmium (Cd), carbon (C), titanium (Ti), niobium (Nb), oxygen (O), nitrogen (N), molybdenum (Mo), or mercury (Hg), or any combination thereof. The doped sulfide solid electrolyte comprises a anode-philic material (M) doped in a sulfide solid electrolyte in which the content of doping is based on phosphorus (P) in the sulfide solid electrolyte, to form the doped sulfide solid electrolyte with a ratio of $M_xP_{1-x}$, where x is 0.001~0.999. Preferably, the said x is at a range of 0.001<x<0.1, more preferably, 0.999<x<0.9. The so-called doping in the present invention is preferred to be the conditions including but not limited to the sulfide solid electrolyte and the anode-philic material are sintered, for example, at high temperature to achieve a state of homogeneous status. Under some circumstances, the doping may also include a physical mixing or a compound formed by the sulfide solid electrolyte and the lithophilic material.

Embodiment 1 of Doped Sulfide Solid Electrolyte

In embodiment 1 of the doped sulfide solid electrolyte 10 of the present invention, the preferred embodiment of the sulfide solid electrolyte used is $Li_6PS_5Cl$ and the anode-philic material is antimony (Sb) to form the doped sulfide solid electrolyte 10 as $Li_6Sb_xP_{1-x}S_5Cl$, where x is 0.001~0.999 to have various doping range of the anode-philic material (Sb).

<Method of Forming an Interface Alloy for a Solid-State Battery to Stabilize the Solid-State Battery>

Referring to FIG. 1, which shows that the aforementioned doped sulfide solid electrolyte 10 is used in a solid-state battery 30 in the present invention, and the effect of stabilizing the solid-state battery 30 during its charging and discharging process.

Step 1) Providing a solid-state battery 30 which comprises at least an anode 31 and a cathode 33, and a doped sulfide solid electrolyte 10 of the present invention is contained between the anode 31 and the cathode 33, wherein the anode 31 is preferably a lithium metal electrode;

Step 2) Conducting at least one charge/discharge cycle on the anode 31 and the cathode 33 of the solid-state battery 30; and Step 3) Forming an alloy 32 at the interface between the anode 31 and the doped sulfide solid electrolyte 10 by the anode-philic material and the anode metal. The thickness of the alloy 32 may preferably be within 30% of the thickness of the material of the cathode 33 (or maybe called a positive electrode).

The alloy 32 is an anode-philic layer formed by the anode metal of the anode 31 and the doped sulfide solid electrolyte 10 (when the anode 31 is lithium metal in this preferred embodiment). Taking the aforementioned embodiment 1 of the doped sulfide solid electrolyte 10 as an example, the alloy 32 will be an antimony (Sb)-lithium (Li) alloy.

Aforementioned steps 2 and 3 could also be in a condition of an alloy formed at an interface between the anode and the doped sulfide solid electrolyte by the anode-philic material and the anode metal after conducting at least one charge/discharge cycle of the solid-state battery.

<Validation Tests>

The present invention takes the aforementioned Embodiment 1 of the doped sulfide solid electrolyte 10 as an example, it uses $Li_6Sb_{0.04}P_{0.96}S_5Cl$ (code LPSC-0.04) formed by antimony, where x=0.04, together with a comparative example $Li_6PS_5Cl$ (code LPSC-P), which has not doped with the anode-philic material as a comparation. This test has conducted by manufacturing them to be a solid-state battery for the present invention embodiment and the comparative example respectively, conducting a charge/discharge, and then proceeding with a relevant validation test. The solid-state battery is galvanostatic symmetric cell battery with Li|SE|Li configuration and is charged and discharged at a current density of 0.1 mA $cm^{-2}$ at room temperature.

Figure 2A:
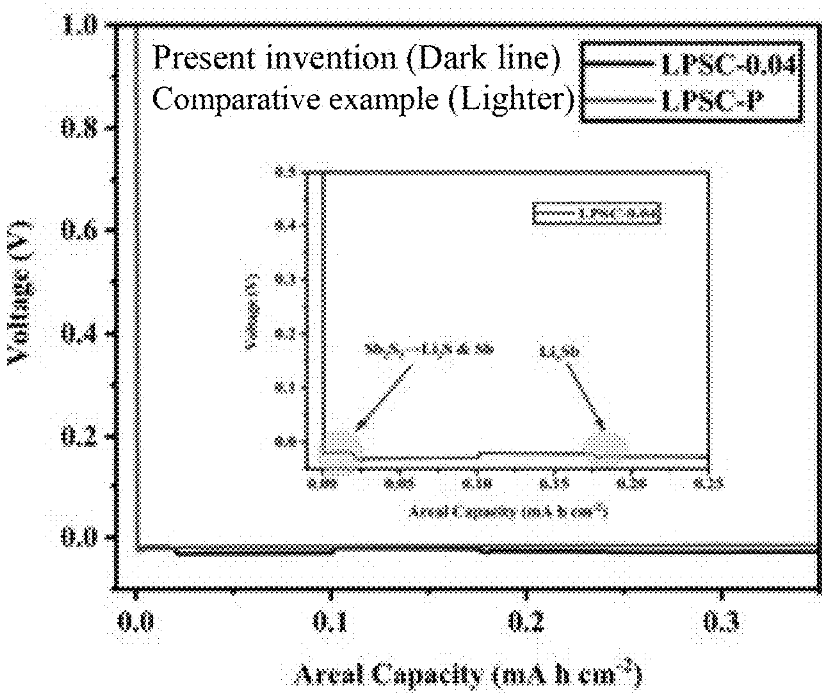
FIGS. 2A and 2B are illustration of the synthesis of the alloy determined after charging and discharging the solid-state battery of the present invention.
Figure 2B:
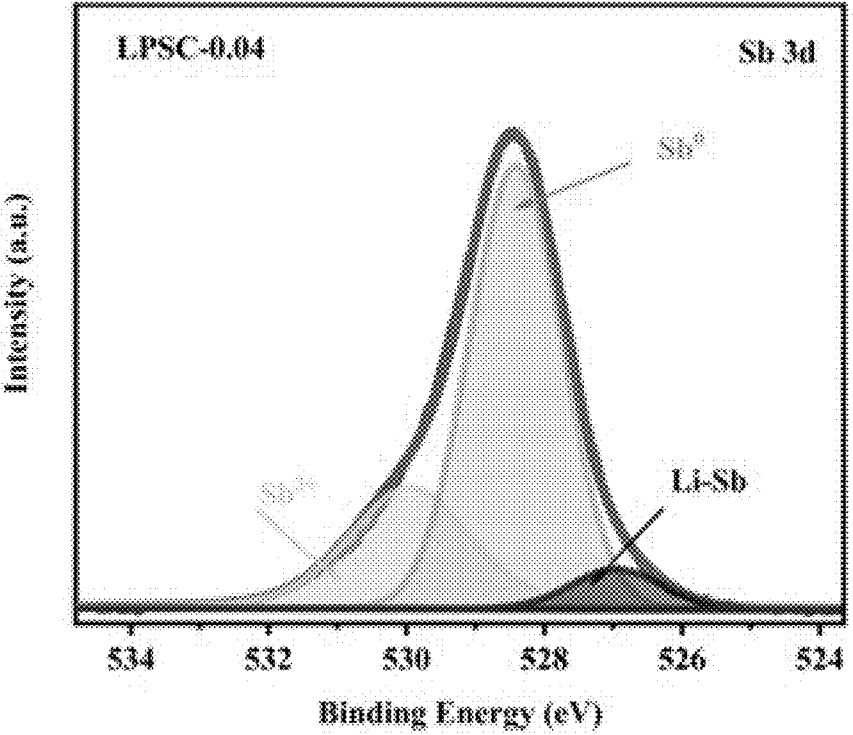

Referring to FIGS. 2A and 2B, confirm that the synthesis of the alloy 32 (Li—Sb) after charging and discharging the solid-state battery, and the synthesis positions is located at the interface between the anode 31 and the sulfide solid electrolyte 10. The binding energy at approximately 525-529 eV in FIG. 2B shows the formation of the alloy 32 (Li—Sb).

Figure 3:
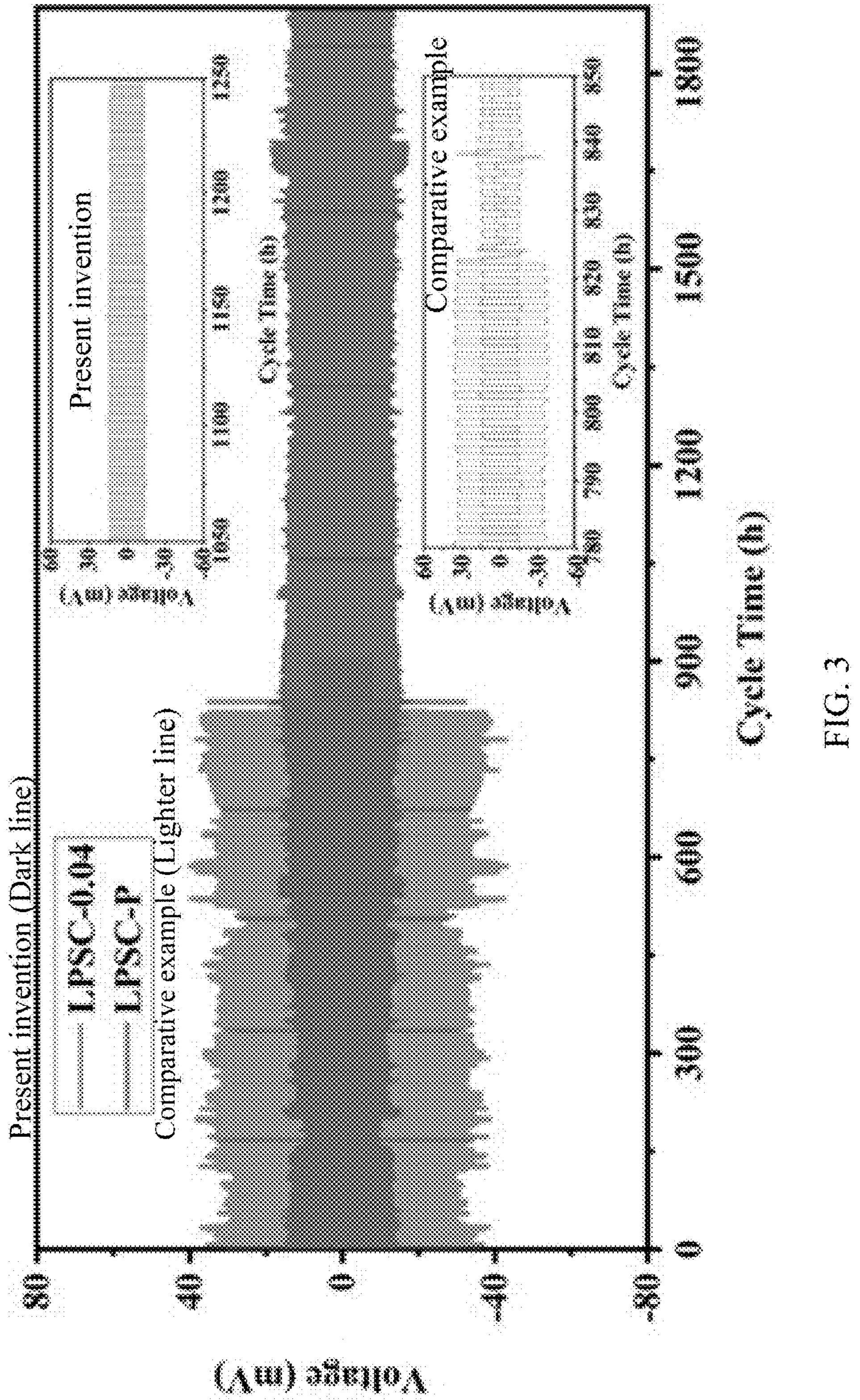
FIG. 3 is the charging and discharging cycle voltage result of the present invention and the comparative example.

Referring to FIG. 3, after a long-term cycle between the present invention and the comparative example, the result of which shows that the present invention can stabilize the electrode-solid electrolyte interface because of the formation of the alloy 32 and it can be cycled as long as 1800 hours, compared with the comparative example where a short circuit occurs within 700 hours to 800 hours, therefore the present invention can indeed significantly extend the service life of a solid-state battery by using the doped sulfide solid electrolyte.

Figure 4A:
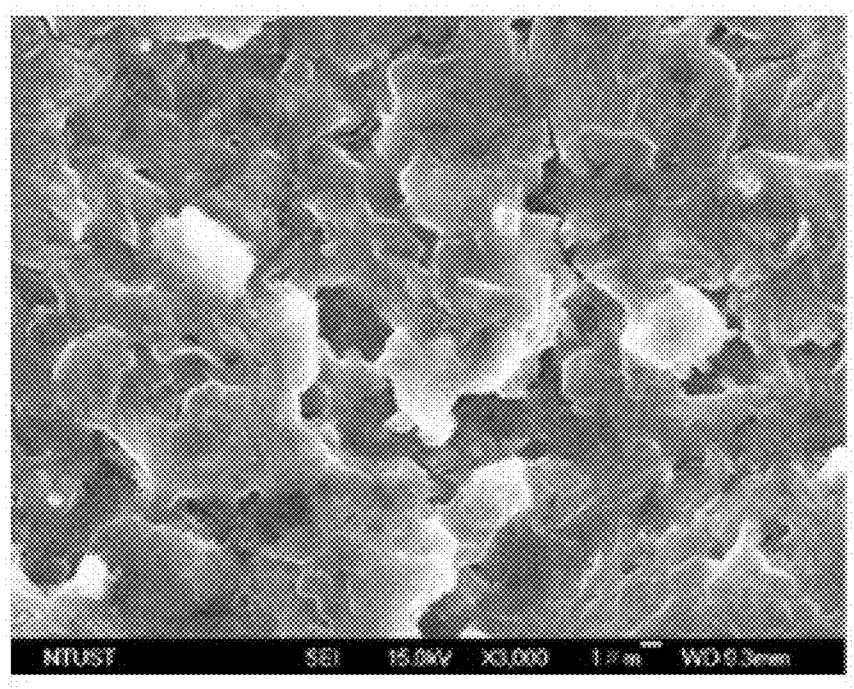
FIGS. 4A and 4B are the scanning electron micrograph (SEM) showing the surface formation of the solid electrolyte charged and discharged for 200 cycles of the comparative example and the present invention, respectively.
Figure 4B:
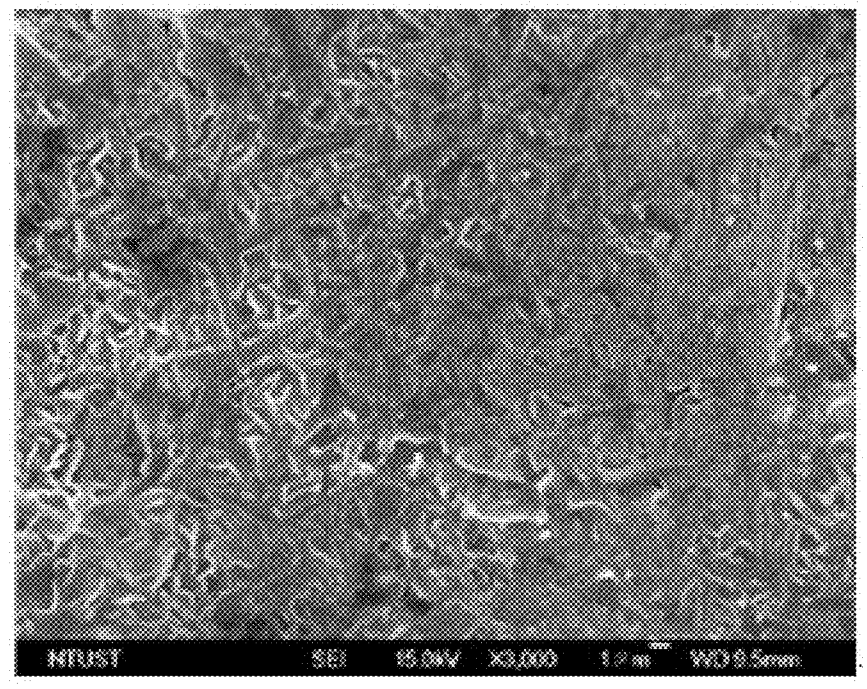

Referring to FIGS. 4A and 4B, which are scanning electron micrographs (SEM) of the electrolyte interface formation of the comparative example and the present invention which has been cycled over 200 cycles between the alloy 32 and the sulfide solid electrolyte 10, respectively. FIG. 4A shows the electrolyte with a large loose, flaking shape, and poor electrical properties of the comparative example that has no protection from the alloy interface, and FIG. 4B shows the electrolyte of the present that has been protected by the alloy and makes the electrolyte denser and has better electrical properties and inhibits the lithium dendrite from penetrating into the anode causing a short circuit, which has a consistent result with FIG. 3.

Figure 5A:
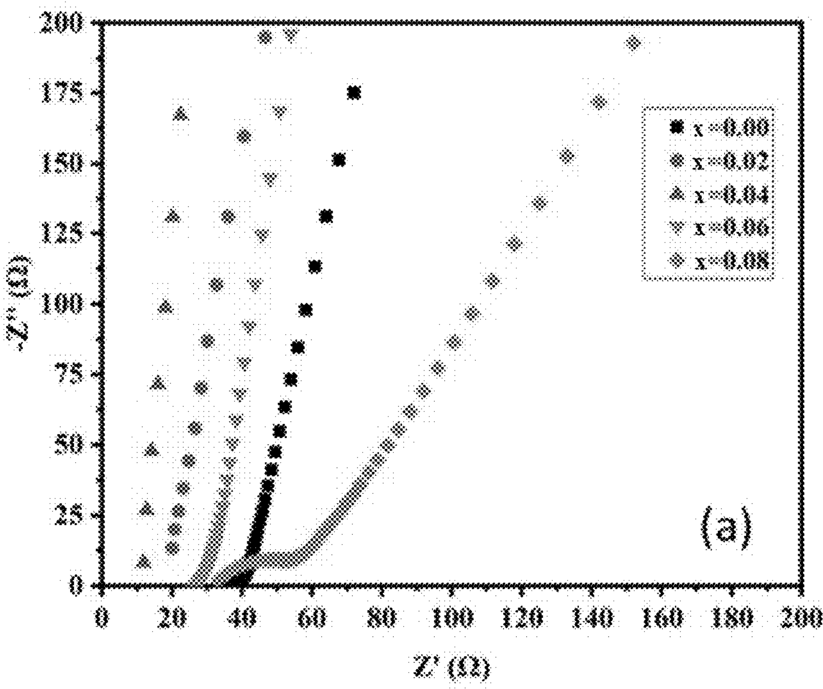
FIGS. 5A and 5B are the impedance analysis, ionic conductivity, and electronic conductivity analysis results of the several preferred embodiments of the present invention in which the anode-philic material is doped with the sulfide solid electrolyte at different contents and the comparative example without doping, respectively.
Figure 5B:
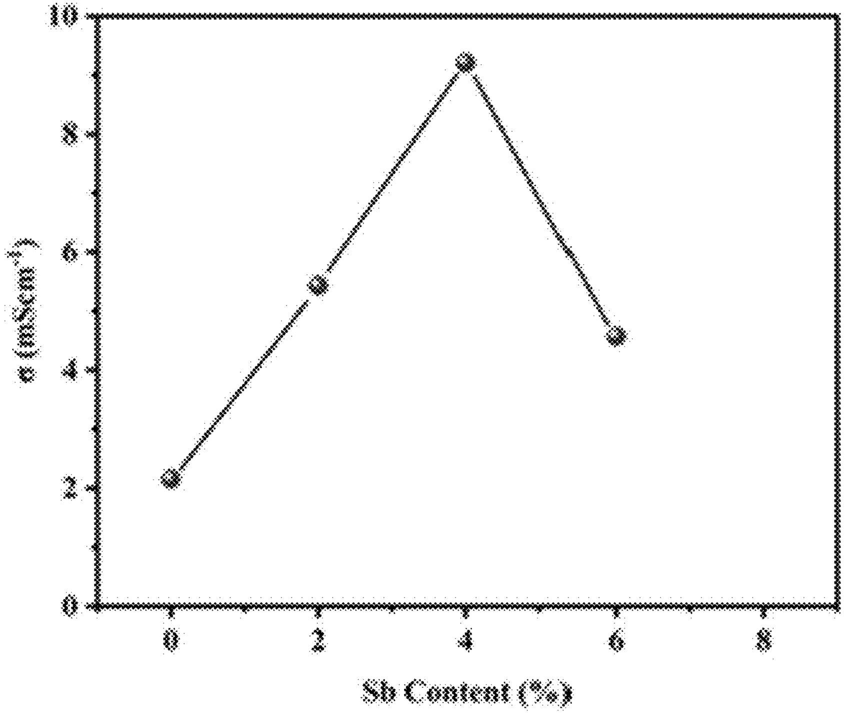

Referring to FIGS. 5A and 5B, which show the impedance analysis of several preferred embodiments of the present invention in which the anode-philic material is doped with the sulfide solid electrolyte 10 at different contents and the non-doped comparative example, respectively. The analysis result of the ionic conductivity and electronic conductivity are shown in following Table 1 and FIG. 5B. As can be seen from FIG. 5A, the doped sulfide solid electrolyte 10 with several different contents of the anode-philic material of the present invention has a smaller impedance, meanwhile, FIG. 5B and Table 1 show that the embodiment of the present invention has better ionic conductivity and lower electronic conductivity, even by a margin of an order.

TABLE 1

| | Ionic Conductivity ($mScm^{-1}$) | Electronic Conductivity ($mScm^{-1}$) |
|---|---|---|
| LPSC-P (Comparative Example) | 2.2 | $6.5 \times 10^{-5}$ |
| LPSC-0.04 (Embodiment) | 9.2 | $6.1 \times 10^{-6}$ |

Figure 6:
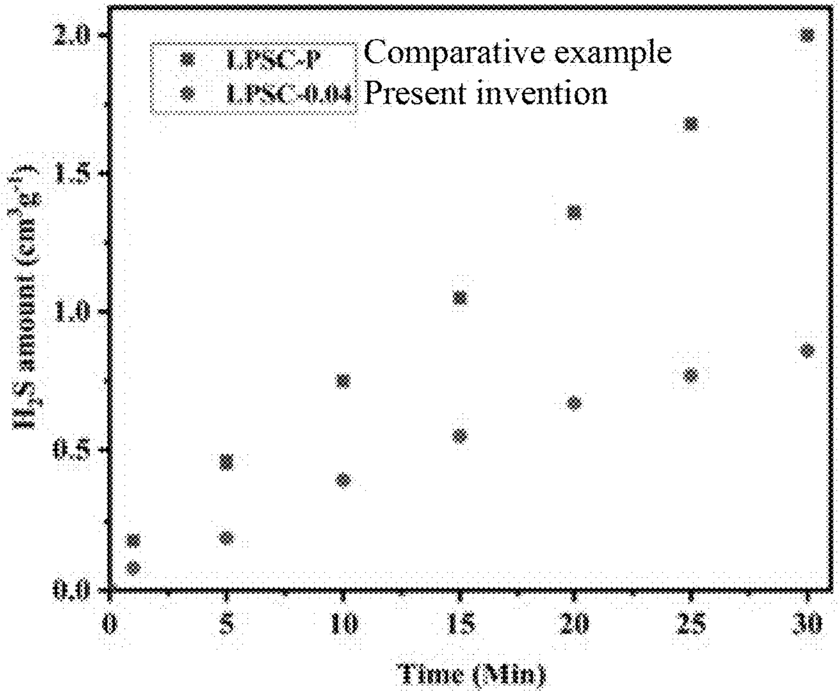
FIG. 6 is the test result of the alloy increasing the moisture resistance of the sulfide solid electrolyte of the present invention.

Referring to FIG. 6, which shows the increase of moisture resistance property of the doped sulfide solid electrolyte 10 of the present invention under exposure to air with 20% humidity for 30 minutes, because the moisture in the air will react with the sulfur atoms n the sulfide solid electrolyte 10 and generate hydrogen sulfide ($H_2S$) gas. The amount of hydrogen sulfide gas generated can be inferred from the moisture resistance property of the doped sulfide solid electrolyte 10, so in FIG. 6, it shows that the present invention has less hydrogen sulfide gas generation and better moisture resistance property.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. An alloy formation method for a solid-state battery comprising steps of:

providing a solid-state battery that comprises at least an anode and a cathode, and a doped sulfide solid electrolyte is contained between the anode and the cathode; and the doped sulfide solid electrolyte comprises an anode-philic material (M) doped in a sulfide solid electrolyte in which the content of doping is based on phosphorus (P) in the sulfide solid electrolyte, to form the doped sulfide solid electrolyte with a ratio of $M_xP_{1-x}$, where x is 0.001~0.999; and the anode comprises an anode metal including Lithium, Sodium, Zinc, Aluminum, Indium, Copper or combination thereof;

conducting at least one charge/discharge cycle of the solid-state battery; and forming an alloy at an interface between the anode and the doped sulfide solid electrolyte by the anode-philic material and the anode metal of the anode.

2. The alloy formation method for a solid-state battery as claimed in claim 1, wherein: $0.001<x<0.1$.

3. The alloy formation method for a solid-state battery as claimed in claim 1, wherein: $0.9<x<0.999$.

4. The alloy formation method for a solid-state battery as claimed in claim 1, wherein: the sulfide solid electrolyte contains a mixture of $(100-x)Li_2S-xP_2S_5$, wherein x is a positive integer less than 100 and a lithium compound (LiB).

5. The alloy formation method for a solid-state battery as claimed in claim 2, wherein: the lithium compound (LiB) comprises lithium fluoride, lithium chloride, lithium bromide, lithium iodide, or any combination thereof.

6. The alloy formation method for a solid-state battery as claimed in claim 3, wherein: the sulfide solid electrolyte comprises $Li_7P_3S_{11}$ or $Li_6PS_5Cl$.

7. The alloy formation method for a solid-state battery as claimed in claim 1, wherein: the anode-philic material comprises an element or a compound comprising element including antimony (Sb), magnesium (Mg), calcium (Ca), strontium (Sr), barium (Ba), scandium (Sc), yttrium (Y), aluminum (Al), gallium (Ga), indium (In), titanium (Ti), silicon (Si), germanium (Ge), tin (Sn), lead (Pb), arsenic (As), antimony (Sb), bismuth (Bi), selenium (Se), tellurium (Te), rhodium (Rh), iridium (Ir), palladium (Pd), platinum (Pt), silver (Ag), gold (Au), zinc (Zn), cadmium (Cd), carbon (C), titanium (Ti), niobium (Nb), oxygen (O), nitrogen (N), molybdenum (Mo), or mercury (Hg), or any combination thereof.

8. The alloy formation method for a solid-state battery as claimed in claim 2, wherein: the anode-philic material comprises antimony (Sb), magnesium (Mg), calcium (Ca), strontium (Sr), barium (Ba), scandium (Sc), yttrium (Y), aluminum (Al), gallium (Ga), indium (In), titanium (Ti), silicon (Si), germanium (Ge), tin (Sn), lead (Pb), arsenic (As), antimony (Sb), bismuth (Bi), selenium (Se), tellurium (Te), rhodium (Rh), iridium (Ir), palladium (Pd), platinum (Pt), silver (Ag), gold (Au), zinc (Zn), cadmium (Cd), carbon (C), titanium (Ti), niobium (Nb), oxygen (O), nitrogen (N), molybdenum (Mo), or mercury (Hg), or any combination thereof.

9. The alloy formation method for a solid-state battery as claimed in claim 3, wherein: the anode-philic material comprises antimony (Sb), magnesium (Mg), calcium (Ca), strontium (Sr), barium (Ba), scandium (Sc), yttrium (Y), aluminum (Al), gallium (Ga), indium (In), titanium (Ti), silicon (Si), germanium (Ge), tin (Sn), lead (Pb), arsenic (As), antimony (Sb), bismuth (Bi), selenium (Se), tellurium (Te), rhodium (Rh), iridium (Ir), palladium (Pd), platinum (Pt), silver (Ag), gold (Au), zinc (Zn), cadmium (Cd), carbon (C), titanium (Ti), niobium (Nb), oxygen (O), nitrogen (N), molybdenum (Mo), or mercury (Hg), or any combination thereof.

10. The alloy formation method for a solid-state battery as claimed in claim 1, wherein: the anode comprises a lithium metal.

11. The alloy formation method for a solid-state battery as claimed in claim 2, wherein: the anode comprises a lithium metal.

12. The alloy formation method for a solid-state battery as claimed in claim 3, wherein: the anode comprises a lithium metal.

13. A solid-state battery comprising at least an anode and a cathode, a doped sulfide solid electrolyte as claimed in claim 1, wherein the doped sulfide solid electrolyte is contained between the anode and the cathode, and an alloy is formed at the interface between the anode and the sulfide solid electrolyte.

* * * * *